United States Patent [19]
Jun

[11] Patent Number: 5,600,531
[45] Date of Patent: *Feb. 4, 1997

[54] CAPACITOR FOR MAGNETRON OF MICROWAVE OVEN

[75] Inventor: Wookeum Jun, Kyeongki-do, Rep. of Korea

[73] Assignee: Daewoo Electronics Co., Ltd., Seoul, Rep. of Korea

[ * ] Notice: The term of this patent shall not extend beyond the expiration date of Pat. No. 5,451,752.

[21] Appl. No.: 307,205

[22] Filed: Sep. 16, 1994

[30] Foreign Application Priority Data

Sep. 18, 1993 [KR] Rep. of Korea ...................... 93-18958
Sep. 18, 1993 [KR] Rep. of Korea ...................... 93-18959
Sep. 18, 1993 [KR] Rep. of Korea ...................... 93-18962

[51] Int. Cl.$^6$ ............................ H01G 4/35; H05B 6/72
[52] U.S. Cl. ........................ 361/302; 219/761; 219/738
[58] Field of Search ...................................... 361/302, 303, 361/311, 330; 219/761, 738, 736

[56] References Cited

U.S. PATENT DOCUMENTS

| | | | |
|---|---|---|---|
| 4,811,161 | 3/1989 | Sasaki et al. | 361/302 |
| 4,985,802 | 1/1991 | Ueno et al. | 361/302 |
| 5,032,949 | 4/1991 | Sasaki et al. | 361/302 |
| 5,142,436 | 8/1992 | Lee et al. | 361/302 |
| 5,451,752 | 9/1995 | Jun et al. | 219/761 |
| 5,455,405 | 10/1995 | Jun | 219/761 |

*Primary Examiner*—Leo P. Picard
*Assistant Examiner*—Phuong T. Vu
*Attorney, Agent, or Firm*—Lowe, Price, LeBlanc & Becker

[57] ABSTRACT

A capacitor for the magnetron of a microwave oven is disclosed, in which the structure is relatively simple, so that the material cost would be saved, and that the productivity would be improved. An elliptic opening is formed on a side wall of a shielding case for installing a capacitor. The circumference of the opening is bent to form a projected portion for attaching a capacitor, and a recess is formed on the reverse side of the projected portion. An insulation resin case is formed on the projected portion so as to surround the capacitor by a molding process using an epoxy resin. An insulation cylinder with an upper portion inserted in the recess also can be molded simultaneously with the insulation resin case. Since in replacement of an insulating case and/or insulating cylinder of a conventional capacitor, an insulation resin structure is formed by a molding process, the number of elements is reduced and the assembling process for attaching these elements is eliminated to thereby improve the productivity. Further, since the holes for fastening a ground fitment are not required, the noise can be effectively shielded.

12 Claims, 9 Drawing Sheets

CAPACITOR FOR MAGNETRON OF MICROWAVE OVEN

BACKGROUND OF THE INVENTION

1. Field of the Invention

The present invention relates to a capacitor for effectively shielding a noise generated in a magnetron of a microwave oven. More particularly, the present invention relates to a capacitor for shielding a noise in a magnetron having a simple structure but a high performance to improve the productivity and to save the overall manufacturing cost.

2. Prior Arts

Generally, various apparatuses such as home microwave ovens, commercial thawing apparatuses, industrial driers and the like using microwaves are provided with a magnetron for generating microwaves, and a capacitor for shielding noises.

In an electric field room of a microwave oven, there is provided with a magnetron for generating microwaves. Such microwaves are generated when a high voltage produced by primary and secondary induction coils of a high voltage transformer which is attached on a base plate of the electric field room, is stably supplied to the magnetron, the high voltages being generated through the inductive interaction between the induction coils. Such microwaves are irradiated into a cooking chamber through an irradiating tube.

When the microwaves are irradiated into the cooking chamber after passing through the irradiating tube, the food placed Within the cooking chamber is heated so as to be cooked, The power supply line of the magnetron is mainly consisted of a filament, a cathode and an anode. When the high voltage is supplied to the magnetron to generate microwaves, unnecessarily radiated microwaves i.e., noises are generated, besides microwaves having basic frequencies which are suitable for heating the food. Then, the noises flow back through the filament and the cathode so as to cause wave obstructions in the nearby apparatuses.

Particularly, coming recently, television broadcasts resorting to satellites are widely utilized. The unnecessary microwaves of the magnetron interact with the broadcasting frequencies and therefore there is a possibility that receiving disorders may occur on a television receiver.

In order to reduce such adverse influences given due to the magnetron noise to the nearby apparatuses, a choke coil and a capacitor connected thereto are provided on the cathode which supplies power to the filament. The choke coil which has a reactance, and the capacitor which is connected to the choke coal absorb the unnecessary microwaves, thereby blocking the leakage of the unnecessary microwaves, The choke coil is sealed within a shielding case which is provided under the magnetron, while the capacitor is installed on the outside of the shielding case. One end of the choke coil is connected to the power supply line of the filament, while the other end is connected to a lead line of the capacitor.

The widely used capacitor is a through-type, and such a through-type capacitor is described in U.S. Pat. No. 4,811,161 (issued to Sasaki et al). In the magnetron using the through-type capacitor, the choke coil is connected in series between the cathode of the magnetron and a through conductor of the through-type capacitor which is inserted in a side wall of the shielding case.

Figure 1:
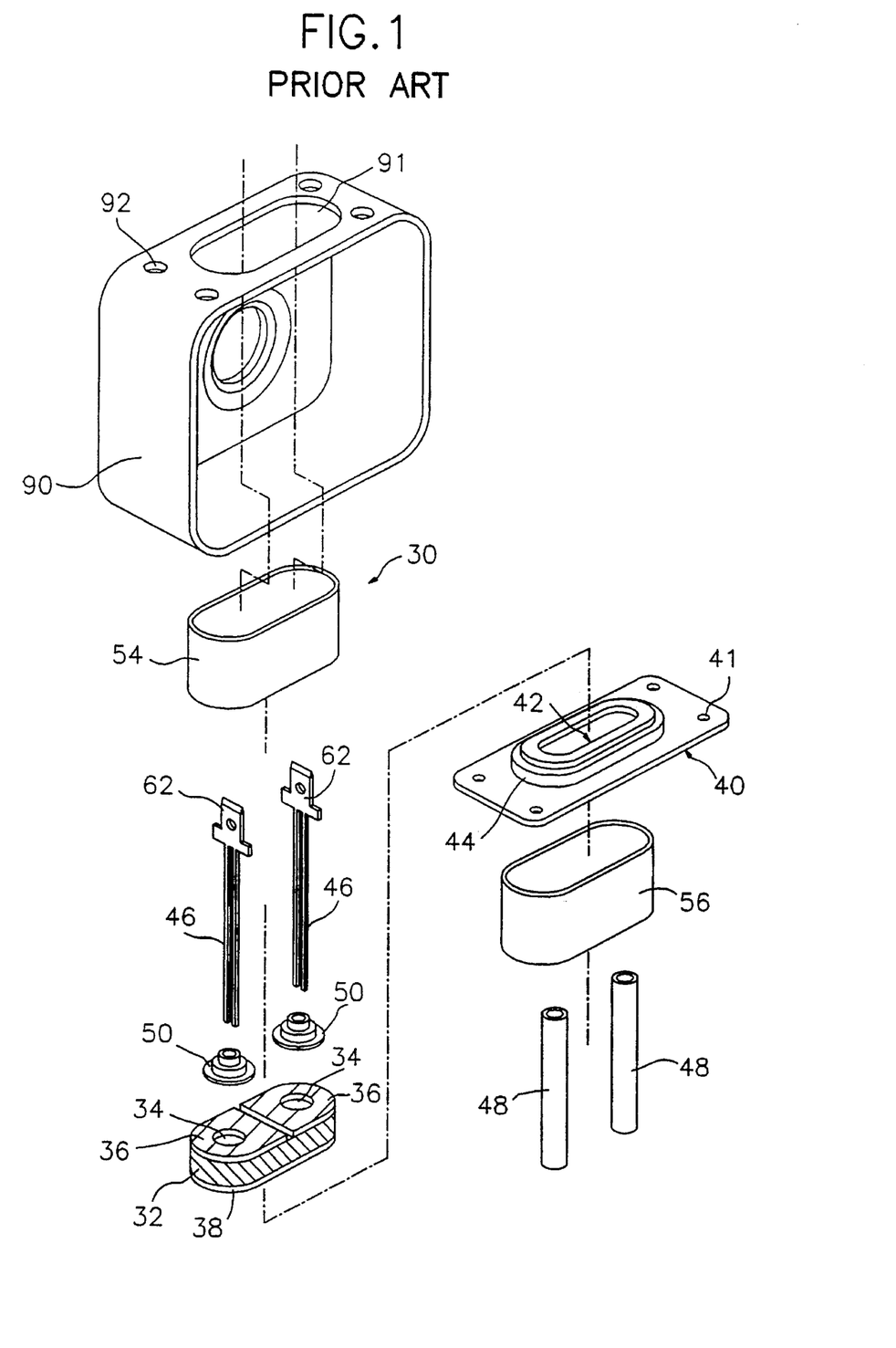
FIG. 1 is an exploded perspective view of the conventional noise shielding apparatus including a through-type capacitor.
Figure 2:
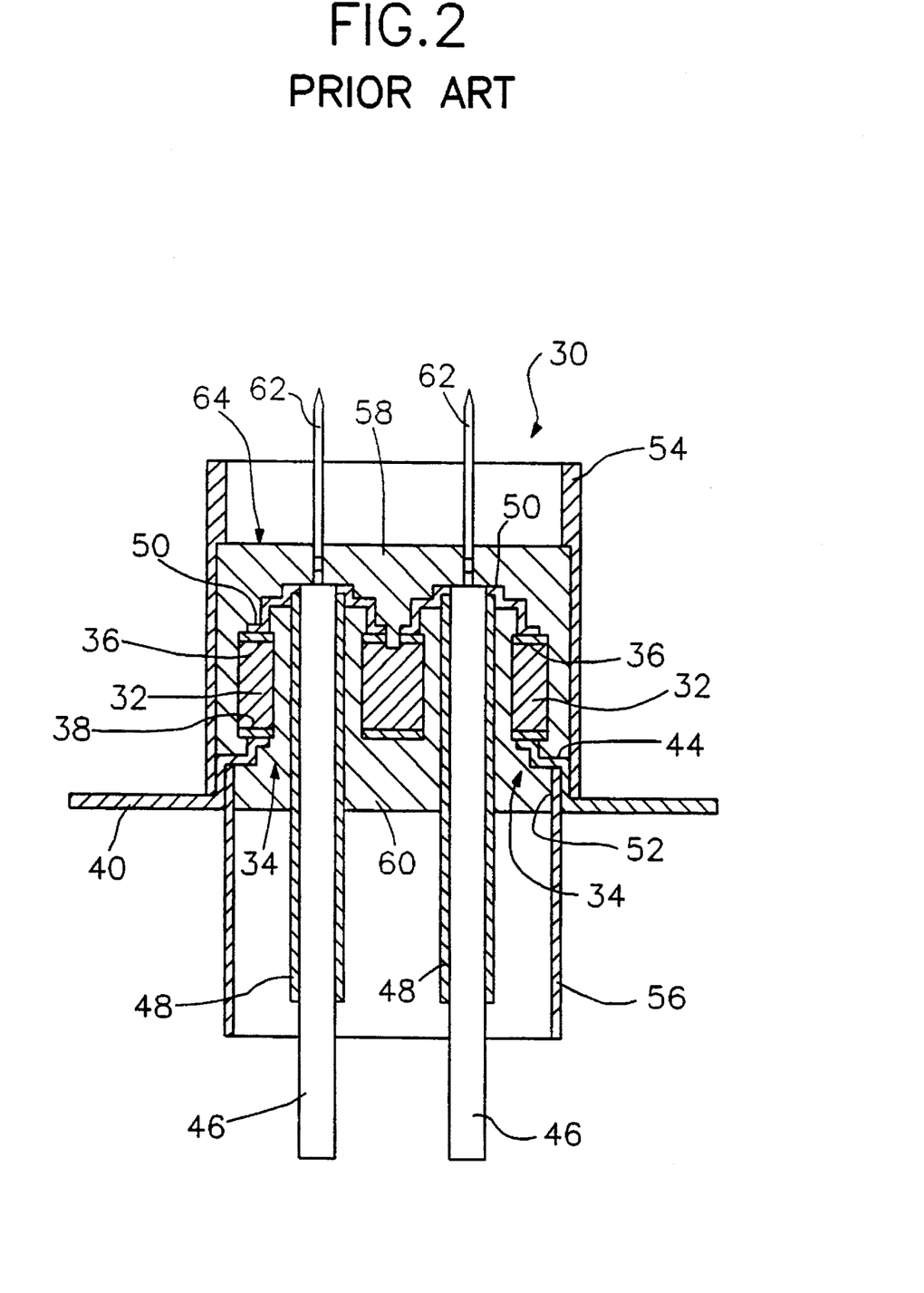
FIG. 2 is a frontal view of the noise shielding apparatus of FIG. 1.

FIG. 1 is an exploded perspective view of a noise shielding apparatus including a conventional through-type capacitor 30 and FIG. 2 is a front sectional view of the through-type capacitor 30 of FIG. 1.

As shown in the drawings, the conventional through-type capacitor 30 includes an elliptic ceramic dielectric 32. Ceramic dielectric 32 is provided with a pair of vertical through holes 34 which are formed substantially in parallel with each other. On the upper surface of ceramic dielectric 32, there are provided with a pair of electrodes 38 which are separated from each other, while a common electrode 38 is provided on the lower surface of ceramic dielectric 32. Separated electrodes 36 and common electrode 38 are provided with through holes corresponding to through hole 34 of ceramic dielectric 32. Capacitor 30 further includes a ground fitment 40 made of a metal in which an elliptic opening 42 is formed at a center portion thereof, on which there is formed an upstand 44 along the circumference of opening 42 with a suitable height. Ceramic dielectric 32 is fixed via common electrode 38 on upstand 44 of ground fitment 40 by a proper means such as soldering or the like.

Further, capacitor 30 includes a pair of through conductors 46 each covered with an insulation tube 48, insulation tube 48 being formed of e suitable material such as silicon. Insulation tube 48 is inserted into through hole 34, and opening 42 and through conductor 46 each are fittedly secured in electrode connectors 50 each of which is fixed on separated electrodes 36 by a proper means such as soldering or the lake. Fixing of through conductor 46 to electrode connector 50 may be carried out by soldering or the like.

Ground fitment 40 is formed by pressing a metal plate in such a manner that upstand 44 should surround opening 42 in a projected contour, and that the other side of ground fitment 40 is provided with a recess 52 so as to form the innersurface of upstand 44. At the four corner portions of ground fitment 40, there are formed four piercing holes 41, so that ground figment 40 may be attached to a shielding case (which is also called a "filter box") 90.

Capacitor 30 further includes an insulation case 54 which surrounds ceramic dielectric 32 and an insulation cylinder 56 which surrounds through conductor 46. The lower portion of insulation case 54 is secured to upstand 44 of ground fitment 40, while the upper portion of insulation cylinder 56 is secured by recess 52 of ground fitment 40. Insulation case 54 and insulation cylinder 56 are filled with insulation resin materials 58 and 60 such as an epoxy resin or the like so as to cover an outside and inside of ceramic dielectric 32 with the resin or embed it therein to thereby ensure moisture proofness and insulating properties of ceramic electric. Reference numeral 64 in FIG. 2 denotes a surface of the insulation resin 58. Insulation case 54 and insulation cylinder 56 are made of a thermoplastic resin such as polybutylene terepthalate(PBT).

Each through conductor 46 is integrally provided with a fastening nab 62 on one end thereof which is to be received into insulation case 54 for applying a high voltage. One end of fastening tab 62 projects from one end of insulation case 54, so that the tab can be easily connected to an external terminal.

When ground fitment 40 is fixedly secured on shielding case 90, shielding case 90 is provided with a large hole 91 corresponding to the capacitor and four bearing holes 92 corresponding to four piercing holes 41 of ground fitment 40. Then bearing holes 92 and piercing holes 41 are matched to assemble them using bolts.

Through-type capacitor 30 which connect the choke coil of the interior of shielding case 90 with an external terminal inhibits the conducting noise from conducting through the lead, and also shields a radiating noise. However, as shown in the drawings, the conventional noise shielding apparatus of a magnetron includes many components assembled together, and therefore, not only the structure is complicated so as to increase the material cost, but also the assembling process is very fastidious so as to lower the productivity. Further, after the assembling, a considerable amount of radiating waves is leaked through the insertion hole 91 of shielding case 90, holes 41 of ground fitment 40 and bearing holes 92 of shielding case 90, with the result that the shielding of the noise cannot be maximized.

Therefore, magnetron manufacturers are expanding efforts to simplify the structure of the capacitor, or to design a new structure in replacement of that of the conventional capacitor.

SUMMARY OF THE INVENTION

The present invention is intended to overcome the above described disadvantages of the conventional technique.

Therefore, it is the object of the present invention to provide a capacitor for the magnetron of a microwave oven, in which its structure is relatively simple, so that the material cost would be saved, and that the productivity would be improved.

For achieving the above object, in accordance with the present invention, there is provided a capacitor for a magnetron, the capacitor comprising:

- a shielding case having an elliptic opening on e side wall thereof and a projected portion formed along the elliptic opening by bending out a circumference portion of the elliptic opening, and a recess formed on an inner surface thereof corresponding to the projected portion;
- an elliptic cylindrical ceramic dielectric having a size corresponding to the elliptic opening of the shielding case, and having a pair of through holes;
- a pair of separated electrodes separately formed on an upper surface of the ceramic dielectric;
- a common electrode formed on a lower surface of the ceramic dielectric and oppositely from the separated electrodes;
- a pair of through conductors passing through the through holes and connected to a choke coil of the magnetron;
- an insulation resin case with a lower portion secured on the projected portion of the shielding case for surrounding an outside and an inside of the ceramic dielectric; and
- an insulation cylinder with its upper portion secured in the recess of the shielding case for surrounding the through conductors. Preferably, the capacitor may further includes a rib formed around the projected portion on the shielding case for reinforcing a strength of the shielding case. A pair of securing tabs each is formed on an upper portions of the through conductors for being connected to an external terminal, and the securing tabs are extended outside of the insulation resin case.

In accordance with one embodiment of the present invention, the capacitor includes e pair of bending pieces formed at a lower portion of a securing tab, the bending pieces being extended horizontally and oppositely to each other and covered with the insulating resin case. At this time, a diameter size of the through holes is greater than a width of the through conductors and smaller than a horizontal extended length of the bending pieces so that the bending pieces neck on peripheral portions around the through holes.

In accordance with another embodiment of the present invention, the capacitor includes a pair of insulation tubes surrounding a pair of the through conductors, respectively. The insulation cylinder may be integrally formed with the insulation resin case and the insulation cylinder and the insulation case are comprised of a same resin. Alternatively, the insulation cylinder may be comprised of a material different from that of the insulation resin case. In such a case, an upper portion of the insulation cylinder is filled with an insulation resin.

The present invention provides a capacitor for a magnetron, the capacitor comprising:

- a shielding case having an elliptic opening on a side wall thereof and a projected portion formed along the elliptic opening by bending out a circumference portion of the elliptic opening, and a recess formed on an inner surface thereof corresponding to the projected portion;
- an elliptic cylindrical ceramic dielectric having a size corresponding to the elliptic opening of the shielding case, and having a pair of through hole;
- a pair of separated electrodes separately formed on an upper surface of the ceramic dielectric;
- a common electrode formed on a lower surface of the ceramic dielectric and oppositely from the separated electrodes;
- a pair of through conductors passing through the through holes and connected to a choke coil of the magnetron;
- an insulation resin structure comprised of an insulation resin case with a lower portion secured on the projected portion of the shielding case for surrounding an outside and an inside of the ceramic dielectric and an insulation resin cylinder with its upper portion secured in the recess of the shielding case for surrounding the through conductors; and
- a pair of securing tabs each formed on upper portions of the through conductors for being connected to an external terminal, and the securing tabs being extended outside of the insulation resin case, the securing tab including e pair of bending pieces formed at a lower portion thereof, the bending pieces being extended horizontally and oppositely to each other and covered with the insulating resin case, and a diameter size of the through holes being greater than a width of the through conductors and smaller than a horizontal extended length of the bending pieces so that the bending pieces neck on peripheral portions around the through holes.

The present invention further provides a capacitor for a magnetron, the capacitor comprising:

- a shielding case having an elliptic opening on a side wall thereof and a projected portion formed along the elliptic opening by bending out a circumference portion of the elliptic opening, and a recess formed on an inner surface thereof corresponding to the projected portion;
- an elliptic cylindrical ceramic dielectric having a size corresponding to the elliptic opening of the shielding case, and having a pair of through holes;
- a pair of separated electrodes separately formed on an upper surface of the ceramic dielectric;
- a common electrode formed on a lower surface of the ceramic dielectric and oppositely from the separated electrodes;
- a pair of through conductors passing through the through holes and connected to a choke coil of the magnetron;

an insulation resin case with a lower portion secured on the projected portion of the shielding case for surrounding an outside and an inside of the ceramic dielectric;

an insulation cylinder with its upper portion secured in the recess of the shielding case for surrounding the through conductors;

a pair of securing tabs each formed on upper portions of the through conductors for being connected to an external terminal; and a pair of insulation tubes surrounding a pair of through conductors, respectively, the insulation tubes each being inserted in each of the through holes.

A projected portion is integrally formed on shielding case so that the projected portion may effectively perform the role of the conventional ground fitment. Thus a separate ground fitment in a conventional capacitor is unnecessary. Further, in replacement of an insulating came and/or insulating cylinder of a conventional capacitor, an insulation resin structure is formed by a molding process in a capacitor of the present invention. Therefore, the number of elements is reduced and the assembling process for attaching these elements is eliminated to thereby improve the productivity.

BRIEF DESCRIPTION OF THE DRAWINGS

The above objects and other advantages of the present invention will become more apparent by describing in detail a preferred embodiment thereof with reference to the attached drawings in which.

FIG, 5 is a side sectional view of the capacitor FIG. 3.

DESCRIPTION OF THE PREFERRED EMBODIMENT

Hereinafter, the present invention will be described in detail referring to the accompanying drawings.
Embodiment 1

Figure 3:
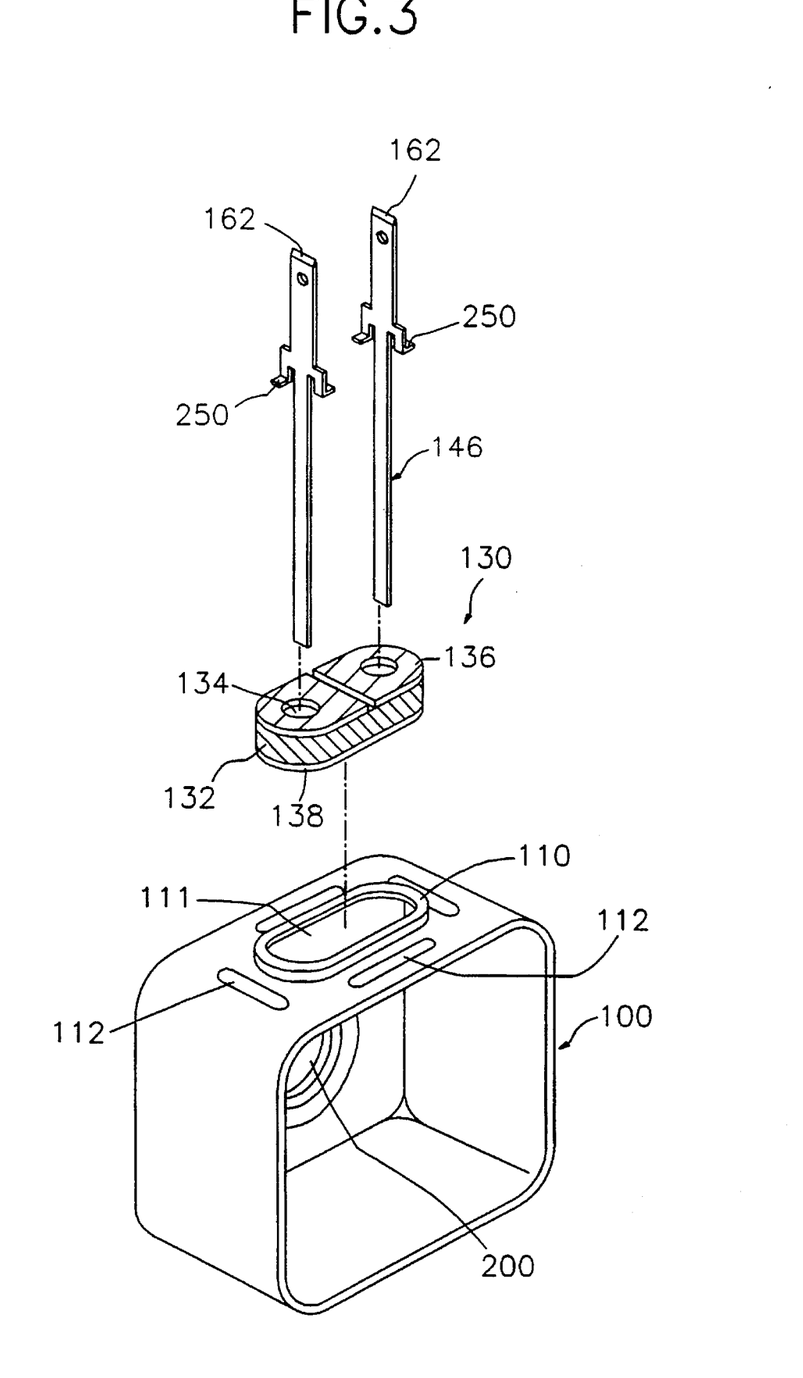
FIG. 3 is an exploded perspective view of a capacitor according to a first embodiment of the present invention.
Figure 4:
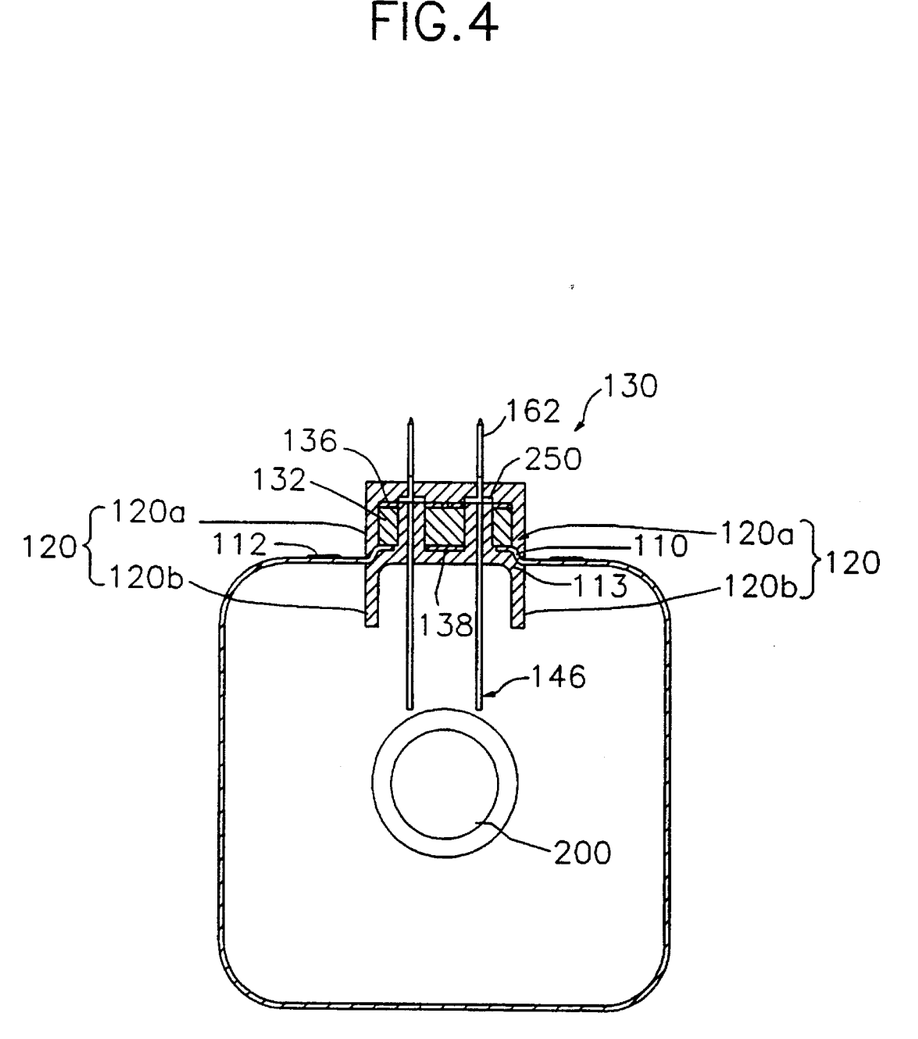
FIG. 4 is a front sectional view of the capacitor of FIG. 3.
Figure 5:
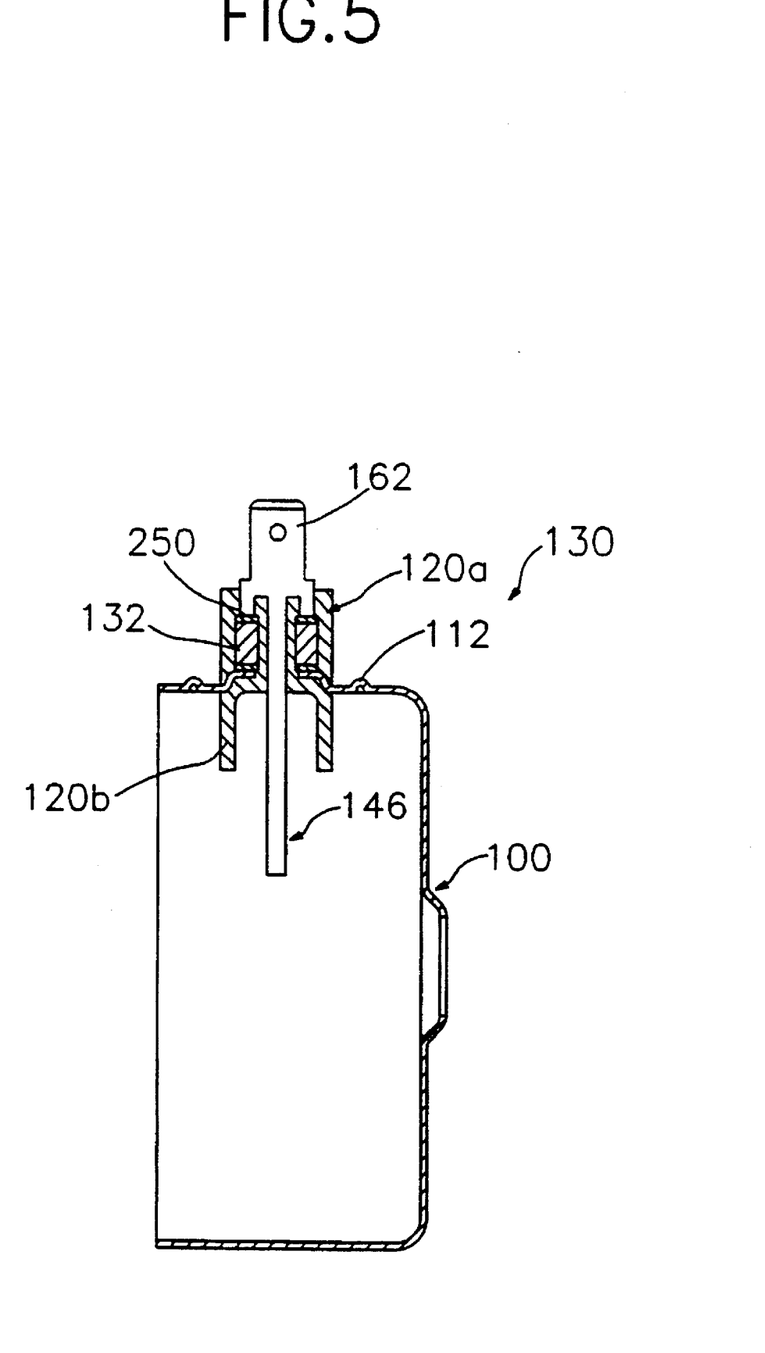

PIG. 3 is an exploded perspective view of a capacitor 130 according to a first embodiment of the present invention, and FIG. 4 is a front sectional view of the capacitor of FIG. 3, and FIG. 5 is a side sectional view of the capacitor of FIG. 3.

Capacitor 130 includes an elliptic ceramic dielectric 132 as in a conventional capacitor, and ceramic dielectric 132 is provided with a pair of vertical through holes 134 which are substantially parallel with each other. Further, a pair of mutually separated electrodes 136 are provided on an upper surface of ceramic dielectric 132, while a common electrode 138 is provided on a bottom surface of ceramic dielectric 132. Separated electrodes 136 and common electrode 138 are provided with through holes corresponding to through holes 134 of ceramic dielectric 132.

Capacitor 130 is secured to a shielding case 100 which is provided with an elliptic opening 111 at a center portion of a side wall thereof for receiving capacitor 130. Further, an opening 200 is formed at a center portion of an upper portion of shielding case 100 for receiving the cathode of a magnetron, while the lower portion of the shielding case 100 is totally open. A projected portion 110 is formed with a proper height around opening 111 by protrudingly bending a circumference portion of opening 111. On an inner surface portion of shielding case 100 a recess 113 is formed corresponding to projected portion 110. Around projected portion 110 and on the surface portions of the shielding case 100, there are formed reinforcing ribs 112 for reinforcing the strength of shielding case 100. Ceramic dielectric 132 is secured to projected portion 110 of shielding case 100 by fixing common electrode 138 to projected portion 110 by a proper means such as soldering or the lake.

Capacitor 130 includes a pair of through conductors 146. Through conductors 146 each is integrally provided with a securing tab 162 to which a high voltage is applied. Securing tab 162 is received into a vertical through hole 134, so that an end portion of securing tab 162 would project from electrodes 136, thereby making it easy to be connected to an external terminal. At a lower portion of each securing tab 162, a pair of bending pieces 250 which bend and extend therefrom in a horizontal direction in opposite to each other are formed. Through conductors 148 are disposed au a center portion of shielding ease 100, and are connected to a choke coil which is connected to the filament of the magnetron, connecting through conductors 146 with the filament being made by a proper means such as soldering or the like. Through conductors 146 are inserted into through holes 134, and opening 111 and through conductors 146 are fixed on separate electrodes 136 by fixing bending pieces 250 thereon. At this time, through holes 134 ate formed so as to have a diameter size greater than the size (i.e. the width) of through conductor 146 for ensuring a sufficient space in which an insulation resin can be filled. Further, through holes 134 are formed so as to have a diameter size smaller than a horizontal length of bending pieces 250 formed at an upper portion of through conductor 146 and at a lower portion of fastening tab 162, so that bending pieces 250 are necked on the peripheral portion of through holes 134. Fixing through conductors 146 on separated electrodes 136 can be performed by a proper means such as soldering or the like.

Capacitor 130 also includes an insulation resin structure 120 comprised of an insulation resin case 120a and an insulation resin cylinder 120b. Insulation resin case 120a surrounds ceramic dielectric 132 and a lower portion thereof is secured on projected portion 110, while the upper portion of insulation resin cylinder 120b which surrounds the through conductors 146 is secured in the recess 113 of the shielding case 100. Insulation resin case 120a and insulation resin cylinder 120b are integrally formed by e molding process. The insulation material in through holes 134 isolates through conductors 146 from the inner surface of through holes 134 ceramic dielectric 132 around through conductors 146. Insulation resin structure 120 is formed by molding an insulation resin material such as an epoxy resin having a good permeability and a good adhesiveness so as to cover an outside and inside of ceramic dielectric 132 and to embed therein to thereby ensure its moisture proofness and its insulating properties.

In the case where capacitor 130 of the present embodiment is used, if a microwave noise which is generated from the magnetron flows reversely, the microwave noise passes through the choke coil which is connected to the filament of the magnetron, with the result that a portion of the noise is offset owing to the reactance of the coil. The rest of the microwave noise passes through through conductors 146 which are connected to the choke coal, and during this passing, a portion thereof is vanished by the capacitor which includes the ceramic dielectric 132 (in which through conductors 146 are inserted). The last remaining portion of the noise is completely dissipated by being grounded to shielding case 100 which is connected with the common electrode 138.

In the present embodiment, shielding case 100 is punched and bent so as to form projected portion 110 around opening 111 integrally with shielding case 100. Projected portion 110 performs the role of the conventional ground fitment (40 in FIG. 1) which is fixedly installed on the shielding case. Since projected portion 110 effectively performs the role of the conventional ground fitment 40, there is not required a separate ground figment.

Further, according to the conventional technique, a capacitor is formed by separately forming an insulation case and an insulation cylinder and then filling the insulation case and the insulation cylinder with an insulation filler. In such a case, since it takes a long time for curing the insulation filler, forming a capacitor will take much time. However, in the present embodiment, an insulation resin structure 120 comprised of insulation resin case 120*a* and insulation resin cylinder 120*b* is simply formed by a molding process in replacement of the insulation case and the insulation cylinder, to fixedly secure ceramic dielectric 132 attached on shielding case 100 and through conductor 134 inserted in through holes 134. Therefore, a capacitor can be simply manufactured without the necessity of an insulation case and an insulation cylinder. Also, curing for the insulation filler is unnecessary so that the working time is shortened.

The insulation material filled in through holes 134 performs the role of insulation tube of the conventional capacitor (48 of FIG. 1) to electrically isolate through conductors 146. Therefore, the insulation tube (48 of FIG. 1) in the conventional capacitor is unnecessary.

Since bending pieces 250 are formed at a lower portion of fastening tab 162 formed on an upper portion of through conductor 146, electrode connectors (50 of FIG. 1) provided on an upper surface of the separated electrodes as in a conventional capacitor, in which through conductors are inserted, are unnecessary.

Capacitor 130 of the present embodiment does not require an insulation case, an insulation cylinder, an insulation tube and an electrode connector when compared to the conventional capacitor as shown in FIGS. 1 and 2. Therefore, the material cost for manufacturing a capacitor is saved, and a working process for installing these elements is unnecessary, thereby making it possible to improve the productivity.

Further, the microwave noise which is generated by the magnetron is continuously dissipated by the ceramic dielectric during passing through through conductors 146 which are inserted in ceramic dielectric 132. Then, the noise is completely dissipated by being grounded to the shielding case 100 which is connected to the common electrode 138. In the present embodiment, when compared to a conventional capacitor, projected portion 110 which performs the role of the conventional ground figment is integrally formed on shielding case 100. Therefore, the surface of common electrode 138 of ceramic dielectric 132 directly contacts with the surface of projected portion 110, and therefore, the grounding resistance is reduced. Therefore, the microwave noise is effectively grounded to shielding case 100 so as to be completely dissipated.

Further, according to the present embodiment, the conventional holes for securing ground fitment 40 to shielding case 100 are unnecessary. On the other hand, in the conventional apparatus, when ground fitment (40 of FIG. 1) is secured to shielding case 100, shielding case 100 has to be provided with four fastening holes, and therefore, the microwave noise is leaked through the four holes of shielding case 100. Therefore, in the present embodiment unlike the conventional capacitor, there is no possibility that noise may, be leaked through the four holes of shielding case 100. Forming reinforcing ribs 112 around projected portion 110 improves the strength of shielding case 100.

Embodiment 2

Figure 6:
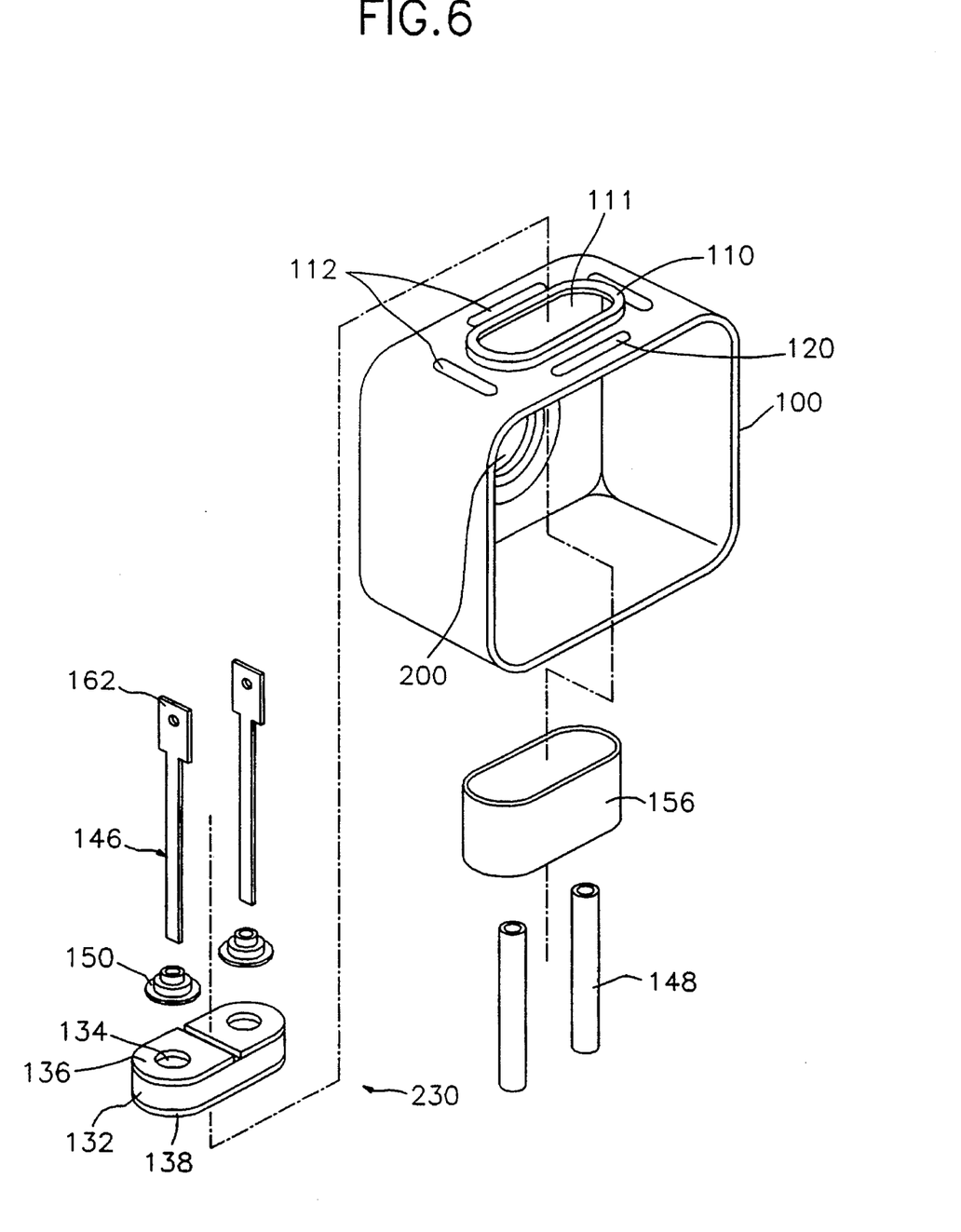
FIG. 6 is an exploded perspective view of a capacitor according to a second embodiment of the present invention.
Figure 7:
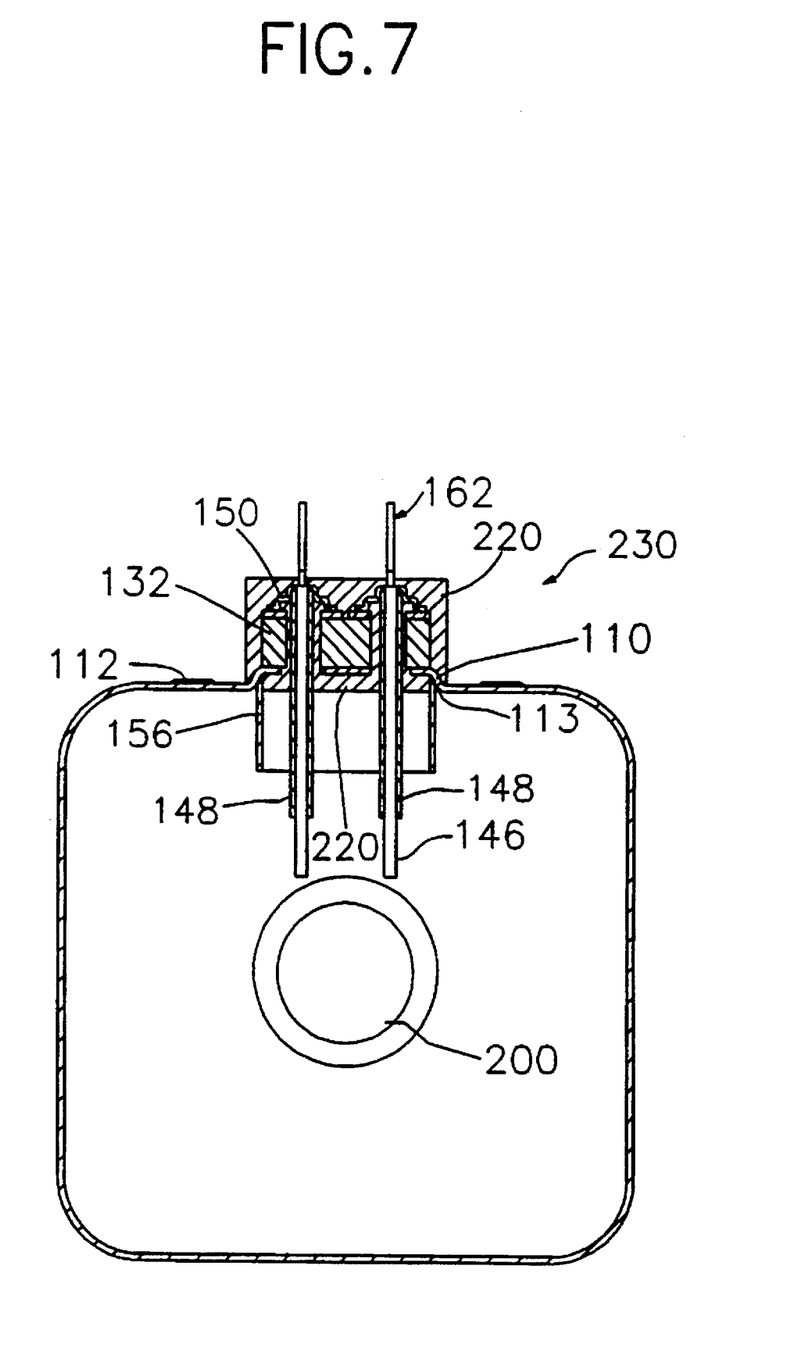
FIG. 7 is a front sectional view or the capacitor of FIG. 6.

FIG. 5 is an exploded perspective view of a capacitor 230 according to a second embodiment of the present invention and FIG. 7 is a front sectional view of the capacitor of FIG. 6.

The present embodiment is similar to Embodiment 1 in that an insulation resin is molded to form an insulation structure. However, the insulation case and the insulation cylinder of a conventional capacitor are replaced with an insulation resin structure in Embodiment 1, an insulation structure is formed with using a conventional insulation cylinder in the present embodiment.

In FIGS. 6 and 7, the same reference numeral as in FIGS. 3 through 5 denote the same members as those of FIGS. 3 through 5.

Capacitor 230 of the present embodiment includes electrode connectors 150 and insulation tube 148 as in a conventional capacitor in replacement of bending pieces 250 of Embodiment 1. Insulation tube 148 having through conductors 146 therein inserted into through hole 134 of ceramic dielectric 132, and through hole 134 and through conductor 146 each are fittedly secured in an electrode connectors 150 each of which is fixed on separated electrodes 136 by a proper means such as soldering or the like. Fixing of through conductor 146 to electrode connector 150 may be carried out by soldering or the like as explained in a conventional capacitor.

Capacitor 230 of the present embodiment includes an insulation cylinder 156 which surrounds through conductor 146 as in a conventional capacitor. The upper portion of insulation cylinder 156 is secured by recess 113 of shielding case 100. Insulation cylinder 155 is formed of a thermoplastic resin such as polybutylene terepthalate (PBT) as in a conventional capacitor.

Capacitor 230 of the present embodiment include an insulation resin structure 220 which surrounds ceramic dielectric 132 and fills through holes 134 and an upper portion of insulation cylinder 156. A lower portion of insulation resin structure 220 is secured on projected portion 110 of shielding case 100. The insulation material in through holes 134 isolates through conductors 146 from the inner surface of through holes 134 ceramic dielectric 132 around through conductors 146. Insulation resin structure 220 is formed by molding an insulation resin material such as an epoxy resin having a good permeability and a good adhesiveness so as to cover an outside and inside of ceramic dielectric 132 and to embed therein to thereby ensure its moisture proofness and its insulating properties, as in Embodiment 1.

The function for shielding the microwave noise of the capacitor according to the present embodiment is the same as explained in Embodiment 1 and therefore an explanation thereof will be omitted.

Capacitor 230 of the present embodiment does not require an insulation case as in Embodiment 1, when compared to the conventional capacitor as shown in FIGS. 1 and 2. Therefore, the material cost for manufacturing a capacitor is saved, and a working process for installing this element is unnecessary, thereby making it possible to improve the productivity.

In the present embodiment, when compared to a conventional capacitor, projected portion 110 which performs the role of the conventional ground fitment is integrally formed on shielding case 100. Therefore, the surface of common electrode 138 of ceramic dielectric 132 directly contacts with the surface of projected portion 110, and therefore, the grounding resistance is reduced. Therefore, the microwave noise is effectively grounded to shielding case 100 so as to be completely dissipated.

Further, according to the present embodiment, the conventional holes for securing ground fitment 40 to shielding case 100 are unnecessary. On the other hand, in the conventional apparatus, when ground fitment (40 of FIG. 1) is secured to shielding case 100, shielding case 100 has to be provided with four fastening holes, and therefore, the microwave noise is leaked through the four holes of shielding case 100. Therefore, in the present embodiment unlike the conventional capacitor, there is no possibility that noise may be leaked through the four holes of shielding case 100. Forming reinforcing ribs 112 around projected portion 110 improves the strength of shielding case 100.

In the present embodiment, shielding case 100 is punched and bent so as to form projected portion 110 around opening 111 integrally with shielding case 100 as in Embodiment 1. Projected portion 110 performs the role of the conventional ground fitment (40 in FIG. 1) which is fixedly installed on the shielding case. Since projected portion 110 effectively performs the role of the conventional ground fitment 40, there is not required a separate ground figment.

Embodiment 3

Figure 8:
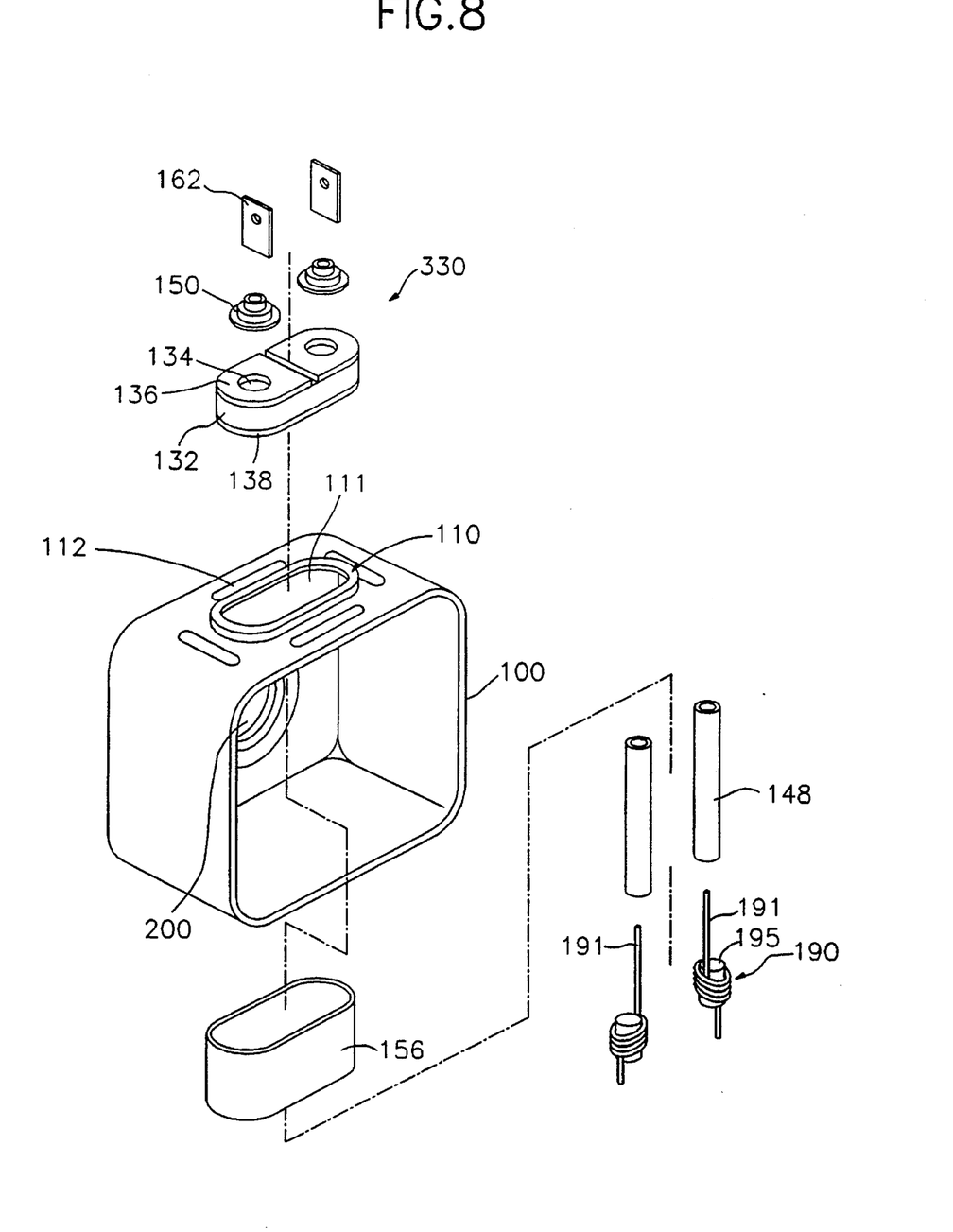
FIG. 8 is an exploded perspective view of a capacitor according to a third embodiment of the present invention.
Figure 9:
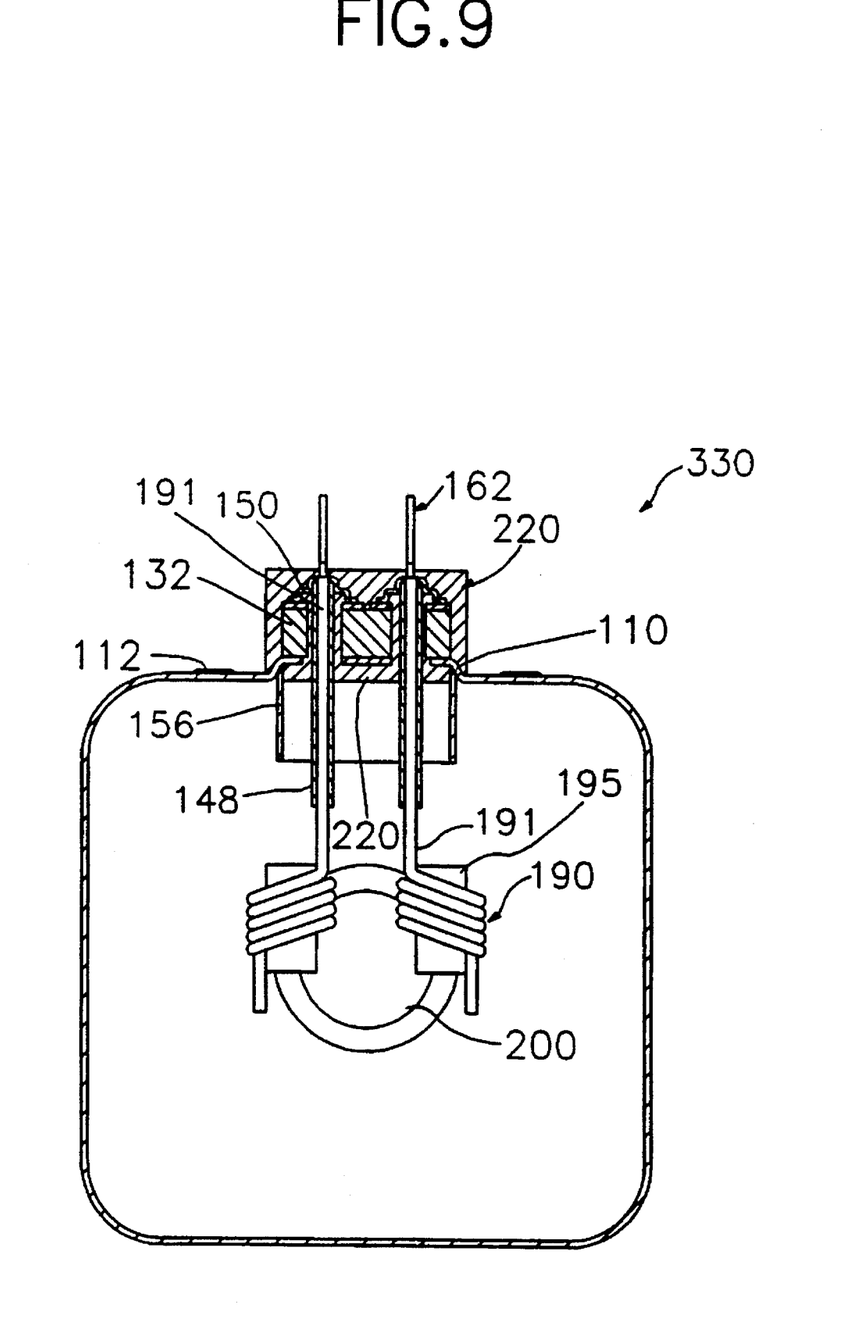
FIG. 9 is a front sectional view of the capacitor of FIG. 8.

FIG. 8 is an exploded perspective view of a capacitor 330 according to a third embodiment of the present invention and FIG. 9 is e front sectional view of the capacitor of FIG. 8.

The capacitor of the present embodiment is the same as in Embodiment 2 except for fastening tab 162 and a choke coil 190 of an inductor 195. The same reference numerals as in Embodiment 2 denote the same members.

In Embodiment 2, fastening tab 162 is formed on an upper portion of through conductor 146 and one end of through conductor 146 is connected to one end of choke coil 190. However, in the present embodiment, lead lines 191 of choke coil 190 are used as through conductors 146 passing through through holes 134. On a one end of each lead lines 191, fastening tab 162 is fixed by a suitable means such as a soldering.

In a conventional capacitor, through conductors each provided with a fastening tab on an upper portion thereof are inserted into through holes of the ceramic dielectric and then the lower portion of each of through conductors is connected to the lead line of the choke coil. In the present embodiment, lead line 191 of choke coil 190 in inductor 195 is directly connected to fastening tab 162. Therefore, separate through conductors are unnecessary to thereby reduce the number of elements and simplify the assembling process.

According to the present invention as described above, a projected portion is integrally formed on shielding case so that the projected portion may effectively perform the role of the conventional ground fitment. Thus a separate ground fitment is unnecessary. Further, in replacement of an insulating case and/or insulating cylinder of a conventional capacitor, an insulation resin structure is formed by a molding process in a capacitor of the present invention. Therefore, the number of elements is reduced and the assembling process for attaching these elements is eliminated to thereby improve the productivity.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A capacitor for a magnetron, said capacitor comprising:

a shielding case having an elliptic opening on a side wall thereof and a projected portion formed along said elliptic opening by bending out a circumference portion of said elliptic opening, and a recess formed on an inner surface thereof corresponding to said projected portion;

an elliptic cylindrical ceramic dielectric having a size corresponding to said elliptic opening of said shielding case, and having a pair of through holes;

a pair of separated electrodes separately formed on an upper surface of said ceramic dielectric;

a common electrode formed on a lower surface of said ceramic dielectric and oppositely from said separated electrodes;

a pair of through conductors passing through said through holes and connected to a choke coil of the magnetron;

an insulation resin case with a lower portion secured on said projected portion of said shielding case for surrounding an outside and inside of said ceramic dielectric; and an insulation cylinder with its upper portion secured in said recess of said shielding case for surrounding said through conductors.

2. The capacitor as claimed in claim 1, said capacitor further comprising a rib formed around said projected portion on said shielding case for reinforcing a strength of said shielding case.

3. The capacitor as claimed in claim 1, said capacitor further comprising a securing tab formed on an upper portion of said through conductors for being connected to an external terminal, and said securing tab being extended outside of said insulation resin case.

4. The capacitor as claimed in claim 3, said capacitor further comprising a pair of bending pieces formed at a lower portion of said securing tab, said bending pieces being extended horizontally and oppositely to each other and covered with said insulating resin case, and a diameter size of said through holes being greater than a width of said through conductors and smaller than a horizontal extended length of said bending pieces so that said bending pieces neck on peripheral portions around said through holes.

5. The capacitor as claimed in claim 1, said capacitor further comprising a pair of insulation tubes each surrounding and supporting each of said through conductors, respectively.

6. The capacitor as claimed in claim 1, wherein said insulation cylinder is integrally formed with said insulation resin case and said insulation cylinder and said insulation case are comprised of a same resin.

7. The capacitor as claimed in claim 6, wherein said insulation case and said insulation cylinder are comprised of an epoxy resin.

8. The capacitor as claimed in claim 1, wherein said insulation cylinder is comprised of a material different from that of said insulation resin case and an upper portion of said insulation cylinder is filled with an insulation resin.

9. The capacitor as claimed in claim 8, wherein said insulation resin case is comprised of an epoxy resin and said insulation cylinder is comprised of a thermoplastic resin.

10. The capacitor as claimed in claim 1, wherein each said through conductors is an upper portion of a lead line of a choke coil of the magnetron.

11. A capacitor for a magnetron, said capacitor comprising:

- a shielding case having an elliptic opening on a side wall thereof and a projected portion formed along said elliptic opening by bending out a circumference portion of said elliptic opening, and a recess formed on an inner surface thereof corresponding to said projected portion;
- an elliptic cylindrical ceramic dielectric having a size corresponding to said elliptic opening of said shielding case, and having a pair of through holes;
- a pair of separated electrode, separately formed on an upper surface of said ceramic dielectric;
- a common electrode formed on a lower surface of said ceramic dielectric and oppositely from said separated electrodes;
- a pair of through conductors passing through said through holes and connected to a choke coil of the magnetron;
- an insulation resin structure comprised of an insulation resin case with a lower portion secured on said projected portion of said shielding case for surrounding an outside and an inside of said ceramic dielectric and an insulation resin cylinder with its upper portion secured in said recess of said shielding case for surrounding said through conductors; and
- a securing tab formed on an upper portion of said through conductor for being connected to an external terminal, and said securing tab being extended outside of said insulation resin case, said securing tab including a pair of bending pieces formed at a lower portion thereof, said bending pieces being extended horizontally and oppositely to each other and covered with said insulating resin case, and a diameter size of said through holes being greater than a width of said through conductors and smaller than a horizontal extended length of said bending pieces so that said bending pieces neck on peripheral portions around said through holes.

12. A capacitor for a magnetron, said capacitor comprising:

- a shielding case having an elliptic opening on a side wall thereof and a projected portion formed along said elliptic opening by bending out a circumference portion of said elliptic opening, and a recess formed on an inner surface thereof corresponding to said projected portion;
- an elliptic cylindrical ceramic dielectric having a size corresponding to said elliptic opening of said shielding case, and having a pair of through holes;
- a pair of separated electrodes separately formed on an upper surface of said ceramic dielectric;
- a common electrode formed on a lower surface of said ceramic dielectric and oppositely from said separated electrodes;
- a pair of through conductors passing through said through holes and connected to a choke coil of the magnetron;
- an insulation resin case with a lower portion secured on said projected portion of said shielding case for surrounding an outside and an inside of said ceramic dielectric;
- an insulation cylinder with its upper portion secured in said recess of said shielding case for surrounding said through conductors;
- a pair of securing tabs each formed on an upper portion of said through conductors for being connected to an external terminal; and
- a pair of insulation tubes surrounding a pair of said through conductors, respectively, said insulation tubes each being inserted in each said through hole.

\* \* \* \* \*